No. 857,306. PATENTED JUNE 18, 1907.
G. RICHARDS.
PULLEY.
APPLICATION FILED MAY 1, 1906.

WITNESSES:
Rob't R. Ketchie
M. M. Hamilton

INVENTOR
George Richards
BY
Harding & Harding
ATTORNEYS.

THE NORRIS PETERS CO., WASHINGTON, D. C.

UNITED STATES PATENT OFFICE.

GEORGE RICHARDS, OF PHILADELPHIA, PENNSYLVANIA.

PULLEY.

No. 857,306.     Specification of Letters Patent.     Patented June 18, 1907.

Original application filed August 9, 1905, Serial No. 273,499. Divided and this application filed May 1, 1906. Serial No. 314,634.

*To all whom it may concern:*

Be it known that I, GEORGE RICHARDS, a citizen of the United States, residing at Philadelphia, county of Philadelphia, and State of Pennsylvania, have invented a new and useful Improvement in Pulleys, of which the following is a full, clear, and exact description, reference being had to the accompanying drawings, which form a part of this specification.

This application is a division of an application filed by me August 9, 1905, Serial No. 273,499.

The object of the invention is to provide such a construction of hub and separable bushing that the pulley may be placed on shafts of different diameters and of diameters less than the hole through the hub of the pulley.

The invention is particularly applicable to pulleys made in two parts or halves and especially to that type of pulley comprising two independent hub members, spaced apart and in alinement with each other on the line of the pulley axis, each hub member being made in two parts or halves divided on a plane extending through the axis, and comprising also pairs of arms, the arms of each pair being secured at their inner ends to the two hub members respectively and at their outer ends bent in opposite directions parallel to the pulley axis and secured by rivets to the inner face of the rim.

The invention is more specifically designed for use in connection with a pulley which is required to be keyed to the shaft.

By my invention, provision is made for maintaining the hub members the required distance apart and for driving the keys without disturbing the fixed distance between the hubs, and the bushing provides a wall of metal of a sufficient thickness to contain the key groove, such thickness being greater than the maximum desirable or practicable thickness of the wall of the hub.

Figure 1:
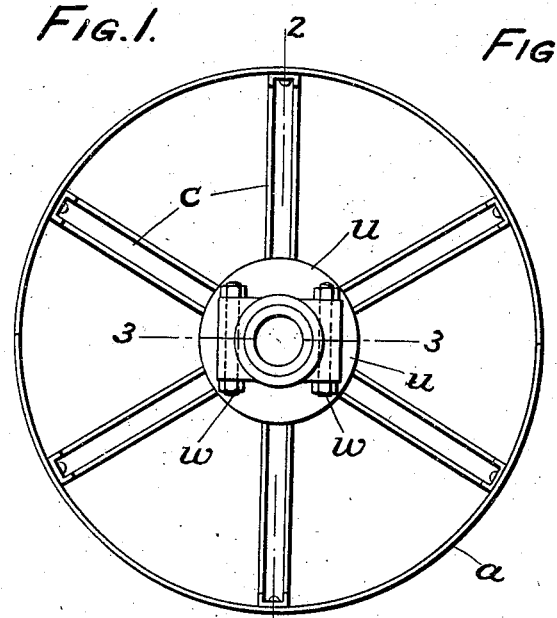
Figure 2:
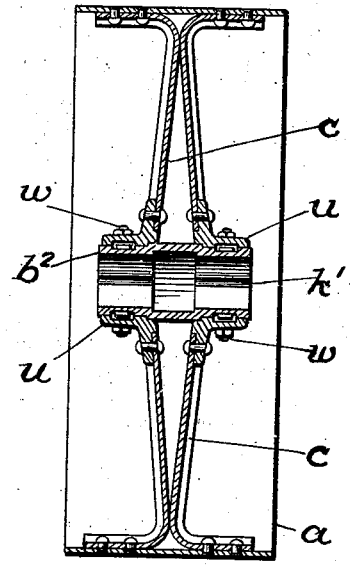
Figure 3:
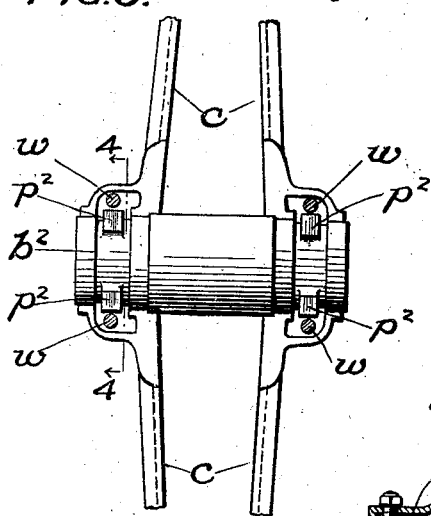
Figure 5:
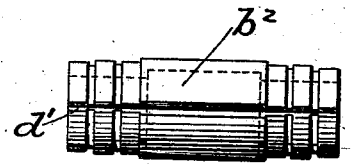
Figure 4:
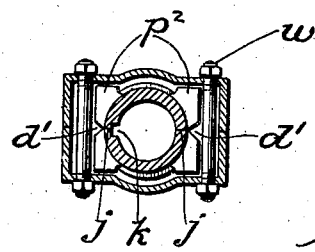

In the drawings. Figure 1 is a side view of the pulley. Fig. 2 is a section on the line 2—2 of Fig. 1. Fig. 3 is an enlarged section on the line 3—3 of Fig. 1. Fig. 4 is a section on the line 4—4 of Fig. 3. Fig. 5 is a side view of the bushing.

$u$ $u$, are the two hub members, each being made in two parts or halves, and comprise special shaped hollow castings having extensions on opposite sides forming recesses substantially rectangular in cross-section.

$c$ represents the arms of the pulley and $a$ the pulley rim.

$w$, $w$ are bolts, extending through the side extensions of the hub members, by which the two halves of each hub member are clamped together.

The bush $b^2$ has a length substantially equal to the distance between the outer ends of the two hub sections and has a key-way extending substantially throughout its length, the bush being thus adapted to extend completely through both hub members. The bush is preferably cast in one piece with longitudinally extending beveled grooves $d'$ made in its opposite sides and broken along this groove to form two parts or halves forming, when put together, the joints $j$, $j$. The key-way $k'$ is shown as formed at one of the joints $j$, although it may be formed in one only of the two parts or halves of the bush between the joints.

The projections $p^2$, four in number for each hub member, extend into the square shaped recesses in the interior of the hub members. These projections lock the bush $b^2$ in the hub members so that it cannot turn with relation to the hub, and the bushing, and consequently the pulley, are driven by the key in the shaft. The projections $p^2$ rest against the sides of recesses in the inner wall of the hub members and thus retain the hubs at the required distance apart. The clamp bolts $w$, $w$, hold the pulley hub members and the bush together to resist the bursting strain of the key.

Having now fully described my invention, what I claim and desire to protect by Letters Patent is:

1. The combination with a hub comprising two hub members each having extensions on opposite sides forming interior rectangular recesses and each being split, through a plane intersecting said extensions, into two parts or halves, of a bush having two pairs of projections, at each of its ends, extending respectively into opposite hub recesses, and bolts, each extending through the hub extensions between the end walls thereof and said projections and securing together the parts or halves of each hub member, said bush spanning the space between the hub members.

2. The combination with a hub comprising two hub members each having extensions on opposite sides forming interior rectangular recesses and each being split, through a plane intersecting said extensions, into two parts or halves, of a bush having two pairs of projections, at each of its ends, extending respectively into opposite hub recesses, and bolts, each extending through the hub extensions between the end walls thereof and said projections and securing together the parts or halves of each hub member, said bush spanning the space between the hub members, and having longitudinally extending grooves extending along opposite sides thereof between the projections of each pair, the bush being split longitudinally into two parts or halves intersecting said grooves.

3. The combination with a hub comprising two hub members each having extensions on opposite sides forming interior rectangular recesses and each being split, through a plane intersecting said extensions, into two parts or halves, of a bush having two pairs of projections, at each of its ends, extending respectively into opposite hub recesses, and, by contacting with the walls thereof, preventing the bush from turning relatively to the hub, and bolts, each extending through the hub extensions between the end walls thereof and said projections and securing together the parts or halves of each hub member.

In testimony of which invention, I have hereunto set my hand, at London, on this 12 day of April, 1906.

GEORGE RICHARDS.

Witnesses:
 ALFRED NUTTING,
 C. P. LIDDON.